United States Patent [19]
Boonstra et al.

[11] 3,969,576
[45] July 13, 1976

[54] APPARATUS FOR READING A RECORD CARRIER WITH AN OPTICAL INFORMATION STRUCTURE

[75] Inventors: Lieuwe Boonstra; Antonius Adrianus Marius van Alem, both of Eindhoven, Netherlands

[73] Assignee: U.S. Philips Corporation, New York, N.Y.

[22] Filed: Jan. 22, 1975

[21] Appl. No.: 543,111

[30] Foreign Application Priority Data
Nov. 13, 1974 Netherlands.................... 7414776

[52] U.S. Cl. ................. 178/6.6 R; 178/6.6 DD; 178/6.7 A; 179/100.3 V; 250/201
[51] Int. Cl.²................. H04N 5/76; G11B 7/12; G11B 17/00
[58] Field of Search ........ 178/6.6 R, 6.6 DD, 6.7 A, 178/DIG. 29, 7.6; 250/201, 202, 203 R, 570, 566; 179/100.3 V, 100.4 R, 100.41 L; 350/255, 286; 356/4; 340/173 LM, 173 LT

[56] References Cited
UNITED STATES PATENTS

| | | | |
|---|---|---|---|
| 3,829,622 | 8/1974 | Elliot | 179/100.3 V |
| 3,876,841 | 4/1975 | Kramer et al. | 179/100.3 V |
| 3,876,842 | 4/1975 | Bouwhuis | 179/100.41 L |

*Primary Examiner*—Raymond F. Cardillo, Jr.
*Attorney, Agent, or Firm*—Frank R. Trifari; Simon L. Cohen

[57] ABSTRACT

In an apparatus for reading a record carrier on which information is stored in an optically readable structure, the radiation which is supplied by the radiation source is split into a read beam and an auxiliary beam for determining the focussing of the read beam on the record carrier. Said auxiliary beam is intercepted by two radiation-sensitive detectors. By disposing a radiation-absorbing knife between the radiation source and the Wollaston prism a part of the auxiliary beam is blocked. Thus, an accurate indication can be obtained of the magnitude and the direction of a focussing error.

3 Claims, 5 Drawing Figures

APPARATUS FOR READING A RECORD CARRIER WITH AN OPTICAL INFORMATION STRUCTURE

The invention relates to an apparatus for reading a record carrier which is provided with information, for example video and/or audio information, in an optically readable structure, which apparatus comprises a radiation source, an objective system for focussing the radiation supplied by the radiation source onto the plane of the information structure, optical means for deriving a read beam and a focussing beam from the radiation supplied by the radiation source, a radiation-sensitive signal detection system for converting the read beam which is modulated by the information structure into an electrical signal, and a radiation-sensitive focus detection system for converting the focussing beam into an electrical signal.

A focussing beam is to be understood to mean an auxiliary beam which is employed to detect the occurrence of deviations between the desired and the actual plane of focussing.

An apparatus of the type mentioned in the preamble is described in the previous patent application Ser. No. 358,994, filed May 10, 1973 and now U.S. Pat. No. 3,876,841. In the previously proposed apparatus a part of the radiation which is produced by a laser is passed through a narrow gap via mirrors, so that a narrow focussing beam is obtained. The beam passes eccentrically through the objective system and is subsequently reflected at the plane of the information structure of a record carrier. The reflected focussing beam traverses the objective system for a second time and is then directed to a focus detection system which consists of two separate radiation-sensitive detectors. The position of the plane of the information structure determines the height at which the reflected focussing beam passes through the objective system and thus the position of the radiation spot which is formed on the focus detection system by said beam. By comparing the output signals of the individual detectors of said system an indication can be obtained about the position of the plane of the information structure relative to the objective system.

The object of the present invention is to provide an apparatus of the afore-mentioned type in which a different principle of focussing detection is utilized and which apparatus is of simple construction. The apparatus according to the invention is characterized in that the said optical means consist of a Wollaston prism which is disposed between the radiation source and the objective system and that between the imaginary radiation source for the focussing beam, which source is formed by said prism, and said prism a radiation-absorbing element is disposed which blocks a part of said beam.

The invention will now be described with reference to the drawing, in which:

FIG. 1 schematically shows a read apparatus according to the invention,

Figure 1:
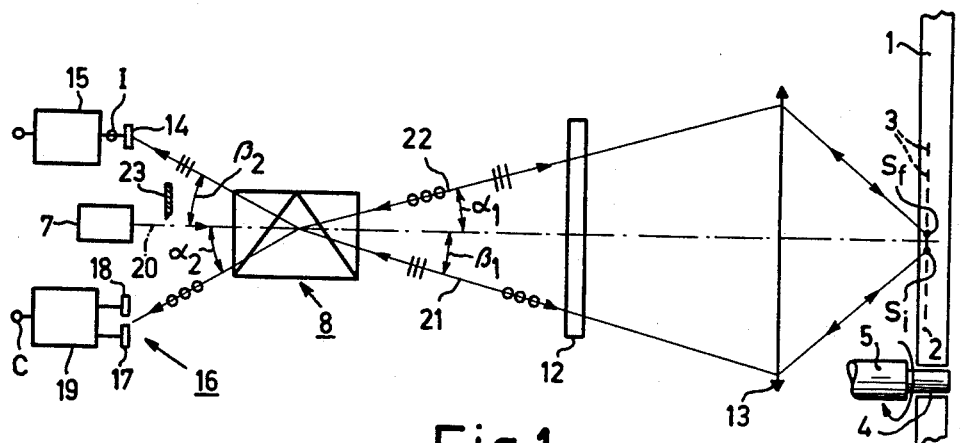

FIG. 1 shows a cross-section of a record carrier 1, which by way of example is assumed to be disc-shaped and round. The information may be contained in said record carrier in a spiral track which consists of a multitude of quasi-concentric sub-tracks 3 which each extend along one revolution over the record carrier. Each sub-track may comprise a multitude of areas which alternate with intermediate areas, in the lengths of which areas and intermediate areas the information may be contained. The areas have a different effect on a read beam than the intermediate areas. The manner in which the information may be recorded in the tracks is irrelevant for the present invention and is therefore not discussed. The plane 2 of the sub-tracks may be disposed at the surface of the record carrier. However, it is also possible that, as is shown in FIG. 1, a protective coating is provided on the information structure. The sort of information that is stored is neither of significance for the present invention; this may be a (colour) television program, an audio program or other information.

The record carrier is read by means of the radiation which is supplied by a radiation source 7, which may for example consist of a helium-neon laser or a light-emitting diode (LED). The radiation source 7 emits a beam of radiation 20, of which for clarity only the chief ray is shown. The path of said beam includes a Wollaston prism 8. The prism divides the unpolarized beam into two linearly polarized subbeams 21 and 22 whose directions of polarization are mutually perpendicular. The sub-beams 21 and 22, of which only the chief rays are shown, emerge from the Wollaston prism at an angle $\beta_1$ and $\beta_2$ respectively to the direction of the original beam 20. The sub-beams 21 and 22 appear to originate from two imaginary radiation sources 24 and 25 as is shown in FIG. 2.

Figure 2:
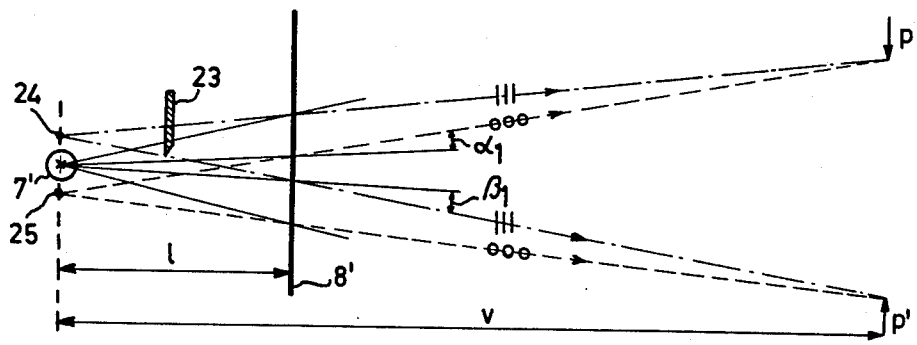
FIG. 2 shows the radiation path in said apparatus.

In FIG. 2 the radiation source is designated 7'. The rays which are emitted by this source are represented by uninterrupted lines. The Wollaston prism is schematically represented as an interface 8' at which beam separation and beam refraction occurs. At the plane 8' two beams are produced whose marginal rays are represented by dashed lines and dash-dot lines. These beams have the same aperture angle as the original beam and they fill the entrance pupil $pp'$ of the objective system completely.

Of said beams one beam, 21 in FIG. 1, may be used as read beam. The direction of polarization of said beam is assumed to be normal to the plane of drawing. The read beam is focussed to a small radiation spot $S_i$ on the plane 2 of the information structure by an objective system 13, which is schematically represented by a single lens. The read beam is reflected by the information structure and traverses the objective system for a second time. When the record carrier is rotated by means of a shaft 5 which extends through a central opening 4 in the record carrier, the read beam is time-modulated in accordance with the sequence of the areas and the intermediate areas in a track to be read.

The modulated read beam then enters the Wollaston prism for a second time. In the radiation path between said prism and the objective system a λ/4-plate 12 is disposed in a diagonal position. "Diagonal position" means that the projection of the optic axis of the λ/4-plate in the plane which is determined by the directions of polarization of the sub-beams 21 and 22 makes an angle of 45° with the directions of polarization. The λ/4-plate is traversed once by the forward (unmodulated) beam and once by the returning (modulated) beam. As a result of this the direction of polarization of the read beam will be rotated through 90°, so that said direction of polarization is parallel to the plane of drawing in FIG. 1. The Wollaston prism deflects the modulated read beam in a direction at an angle $\mu_2$ to the direction of the beam which is emitted by the source 7.

The modulated read beam is finally intercepted by a signal detection system which takes the form of one radiation-sensitive detector 14. At the output of said detector an electrical signal I develops which is time modulated in accordance with the sequence of areas and intermediate areas in a track to be read. This signal can be processed in known manner in an electronic device 15, to a signal which is adapted to be applied to a conventional apparatus for reproducing the information which is stored on the record carrier.

The radiation beam 22, whose direction of polarization is parallel to the plane of drawing in FIG. 1, is employed as focussing beam, i.e. as auxiliary beam for determining a deviation between the desired and the actual position of the plane of the information structure relative to the objective system. The focussing beam first traverses the λ/4-plate 12 and is subsequently focussed to a second radiation spot $S_f$ at the plane of the information structure by the objective system 13. The reflected focussing beam then passes through the objective system and the λ/4-plate for a second time, so that its direction of polarization will be perpendicular to the plane of drawing. The Wollaston prism then deflects the focussing beam to the focus detection system 16 at an angle $\alpha_2$. This system consists of two separate radiation-sensitive detectors 17 and 18.

Figure 3:
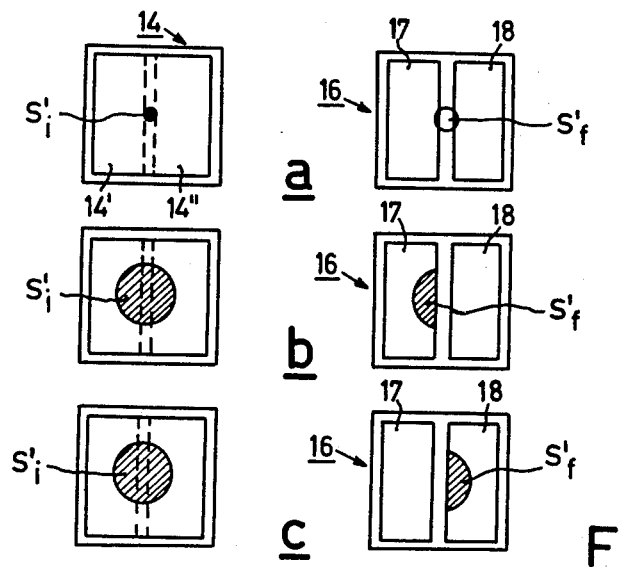
FIG. 3 shows the behavior of the read spot and the focussing spot in the plant of the signal detection system and the focussing detection system respectively.

The right part of FIG. 3 shows a front view of said system. The radiation spot which is projected on the detectors 17 and 18 is designated $S_f'$. The left part of FIG. 3 shows the projection $S_i'$ of the read beam on the signal detector 14.

If the plane of the information structure is in the desired position relative to the objective system, the radiation spots $S_i$ and $S_f$ are sharply re-imaged on the detectors. The radiation spots $S_f'$ and $S_i'$ then have minimum dimensions and the radiation spot $S_f'$ is symmetrically incident on the radiation-insensitive area between the detectors 17 and 18. This situation is represented in FIG. 3 under $a$. When the plane of the information structure moves to the left or to the right, the radiation spots $S_f'$ and $S_i'$ will expand.

According to the invention steps are taken that when the plane of the information structure becomes defocussed, i.e. when deviations occur between the desired and the actual position of said plane, the focus detection system is asymmetrically exposed by the focussing beam. This can be achieved by interposing a knife-edged radiation-absorbing element 23, between the radiation source 7 and the Wollaston prism 8, so that a part of the radiation which is emitted by the source is blocked on its way to the Wollaston prism. As can be seen in FIG. 2 the element 23 only absorbs a part of the radiation which is emitted by the imaginary source 24. By arranging the element 23 in this manner, the read beam is not substantially affected and the output signal of the signal detector 14 is not substantially attenuated. On the other hand, the element 23 blocks at least half the focussing beam. The sub-beams 21 and 22 which are formed by the Wollaston prism and which are aimed at the entrance pupil of the objective system are observed by the objective system as originating from two light sources under different solid angles. As a result of this, one of the beams can be suppressed for a substantial part, while the other beam remains substantially unaffected.

When the plane of the information structure is in focus the presence of the element 23 only results in a reduction of the intensity in the spot $S_f$. The two detectors 17 and 18 then do not supply different signals. As the focussing beam does no longer fill the entire entrance pupil of the objective system the radiation spot $S_f'$ in the situation $a$ in FIG. 3 is slightly larger than the radiation spot $S_i'$. The radiation spot $S_f'$ is symmetrically incident on the detectors 17 and 18. When defocussing occurs the limitation of the read beam which is introduced by the element 23 will become visible in the radiation spot $S_f$. When the defocussing increases one part of the radiation spot $S_f$ will expand and the other part will shrink, so that one of the detectors will receive an increasingly larger amount of radiation than the other detector. Which of the two detectors receives more radiation depends on the direction of the defocussing. FIG. 3b shows the situation in the case that the plane of the information structure is too close to the objective system, and FIG. 3c the situation when said plane is too far from the objective system.

By subtracting the output signals of the detector 17 and 18 from each other, for example in an electronic circuit 19, a signal C for focussing correction can be obtained. The manner in which the control signal is formed and the manner in which the focussing is corrected are no object of the present invention and will therefore not be discussed.

To obtain the required blocking of the focussing beam the Wollaston prism should not be disposed too far from the light source. The location of the Wollaston prism determines how far the read beam and the focussing beam can be spaced apart. When the Wollaston prism is made of quartz, the angle $\alpha_1$ substantially equals the angle $\beta_1$, while the angle $\alpha_2$ substantially equals the angle $\beta_2$. Furthermore, the angle $\alpha_2$ is approximately 2x the angle $\alpha_1$ and the angle $\beta_2$ approximately 2x the angle $\beta_1$. In one embodiment of an apparatus according to the invention, in which the objective system consisted of a lens with a numerical aperture of 0.4 and a magnification of 20x, and in which the angle $\alpha_1 \simeq 2 \cdot 10^{-2}$ rad, the quotient of the distance between the source and the Wollaston prism and the distance between the source and the entrance pupil of the objective system, the quotient $1/v$ in FIG. 2, had to be smaller than 0.5.

Figure 4:
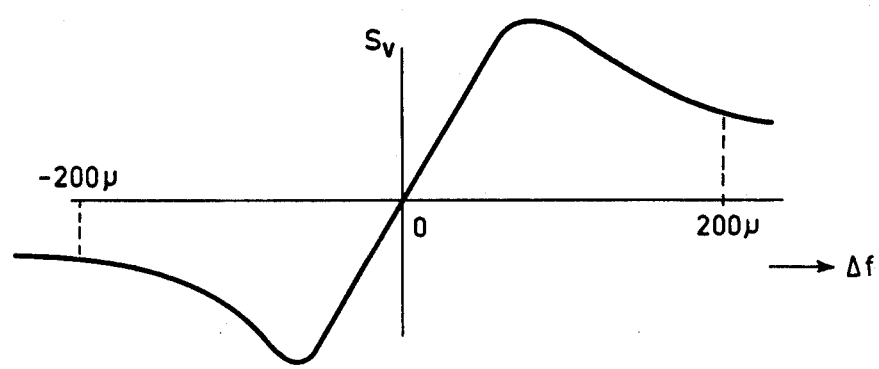
FIG. 4 shows the variation of the control signal thus obtained as a function of the defocussing.

By means of the apparatus described a focus control signal of great steepness can be obtained. FIG. 4 shows the variation of the amplitude of the signal $S_v$, which is the difference of the signals supplied by the detectors 17 and 18 as a function of the defocussing $\Delta f$. When the detectors 17 and 18 are photodiodes $S_v$ can be plotted in nano-amperes. Owing to the greater slope of the signal $S_v$ around the zero point ($\Delta f=0$) it is possible to accurately detect whether the plane of the information structure is in focus. Said slope is steeper as a greater part of the focussing beam is blocked by the knife 23. In practice the element 23 is arranged so that at least half the focussing beam is blocked. When the knife is disposed slightly higher it is still possible to obtain a suitable control signal, so that the location of the knife is not very critical.

The range within which focussing errors can be detected is determined by the size of the focussing diodes 17 and 18 and the amount of radiation which is emitted by the source 7. In a realized embodiment of an apparatus according to the invention using a LED as radiation source, focussing errors of −200 μm to +290 μm could be detected.

The position of the Wollaston prism relative to the detectors 17 and 18 is rather critical. A deviation from said position will lead to incorrect focussing detection. For example, in the realized embodiment of a read apparatus according to the invention a deviation of 20 μm in the position of the detectors 17 and 18 relative to the Wollaston prism resulted in a focussing error of 3 μm being detected, whilst in reality the plane of the information structure was in focus. When the detectors of the focus detection system are rigidly connected to those of the signal detection system, it is possible according to the invention to eliminate the effect of a deviation in the position of the focus detectors relative to the Wollaston prism. For this purpose, the signal detector 14 is divided into two halves 14' and 14", as is indicated by the dotted lines in the left part of FIG. 3, and the difference of the signals supplied by the detectors 14' and 14" is determined. In the case of a displacement of the Wollaston prism relative to the focussing detectors the difference signal of the detectors 17 and 18 and also that of the detectors 14' and 14" will vary, independently of the focussing on the plane of the information structure. When the signals supplied by the detectors 14', 14", 17 and 18 are designated $S_{14'}$, $S_{14''}$, $S_{17}$ and $S_{18}$, the information which is stored in the record carrier can be recovered from:

$$S_1 = S_{14'} + S_{14''};$$

the focus error can be derived from:

$$S_2 = S_{17} - S_{18};$$

whilst the signal $$S_3 = (S_{14'} - S_{14''}/2) - (S_{17} - S_{18})$$

may be used for correcting the position of the detectors and the Wollaston prism relative to each other.

For apparatuses for optically reading a record carrier it has been proposed previously to separate the modulated read beam from the unmodulated read beam with the aid of a Wollaston prism and a λ/4-plate. The source then emits light that is polarized in one of the polarization directions of the Wollaston prism, so that only one beam emerges from the prism which is deflected at a certain angle. By simple means such an apparatus can be adapted for focus detection according to the invention. The only additional elements to be employed are then a radiation-absorbing element between the Wollaston prism and the radiation source which should emit radiation having polarization direction components that are the same as the polarization direction of the Wollaston prism, and two focus detectors. In that case highly effective use is made of the Wollaston prism.

It is alternatively possible to employ the Wollaston prism only for forming two beams at different solid angles. The modulated and the unmodulated beams can then be separated with a semitransparent mirror between the Wollaston prism and the objective system. It is then not necessary to include a λ/4-plate in the radiation path.

The Wollaston prism in the apparatus of FIG. 1 is of a special type. Said prism consists of three component prisms 9, 10 and 11 of a birefringent material (see FIG. 5). The optic axes 9' and 11' of the component prisms 9 and 11 are parallel to each other, while the optic axis 10' of the component prism 10 is normal to the optic axes 9' and 11'. Owing to the symmetrical construction the composite prism 8 is non-astigmatic.

Figure 5:
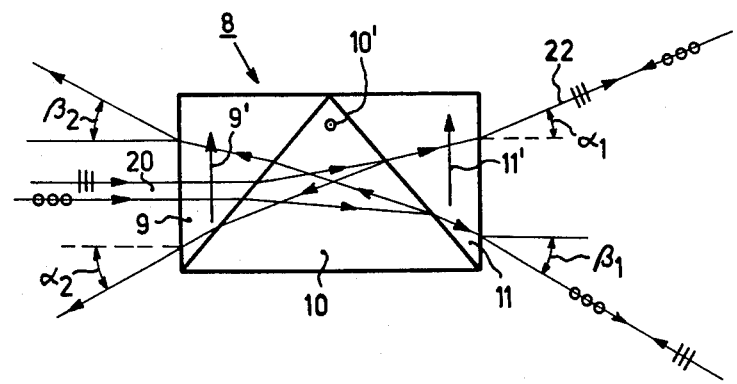
FIG. 5 shows the radiation path through a special Wollaston prism used in the present apparatus.

FIG. 5 shows the radiation path through such a prism. The chief ray of the beam 20 passes through the component prism 9 without being refracted. For a sub-beam whose direction of polarization is parallel to the plane of drawing, the focussing beam in FIG. 1, the chief ray traverses the component prism 10 as ordinary ray and the component prism 12 as extraordinary ray, and is refracted through a certain angle by each of the component prism, so that the chief ray is deflected through a total angle $\alpha_1$ relative to the direction of the incident ray, depending on the refractive indices of the material of the component prisms. After passing two times through a λ/4-plate which is disposed in the diagonal position, the relevant beam has a direction of polarization which is perpendicular to the plane of drawing. The chief ray of the beam which is thus polarized passes through the component prism 11 as ordinary ray, through the component prism 10 as extraordinary ray and through the component prism 9 as ordinary ray. The chief ray of the sub-beams 22 emerges from the composite prism at an angle $\alpha_2$ relative to the chief ray of the incident beam.

The chief ray of the sub-beam whose direction of polarization is perpendicular to the plane of drawing (the read beam in FIG. 1) traverses the component prism 10 as extraordinary ray and the component prism 11 as ordinary ray and is deflected through a total angle of $\beta_1$. After having traversed the λ/4-plate twice, the chief ray passes through the component prism 11 as extraordinary ray, through the component prism 10 as ordinary ray and through the component prism 9 as extraordinary ray, so that the chief ray of the sub-beam 21 is deflected through an angle $\beta_2$. When the prism material is quartz $\alpha_2$ and $\beta_2$ are approximately equal and twice $\alpha_1$ or $\beta_1$.

Instead of a symmetrical Wollaston prism, it is also possible to employ a conventional Wollaston prism in the apparatus of FIG. 1. The angles of refraction of such a prism, however, are only half those of the prism of FIG. 5. Moreover, the conventional prism is astigmatic.

The invention has been described with reference to an apparatus for reading a reflecting record carrier. However, it is equally possible to read a radiation-transmitting record carrier with an apparatus according to the invention. In that case the radiation source is disposed at one side and the radiation-sensitive detectors of the signal detection system and the focus detection system are disposed at the other side of the record carrier. The Wollaston prism is then only used for the formation of two spatially separate beams, a read beam and a focussing beam. In the radiation path between the record carrier and the radiation-sensitive detectors a second objective system may be disposed for concentrating the read beam and the focussing beam on the read detector and the focus detectors respectively.

What is claimed is:

1. An apparatus for reading a record carrier which is provided with information, for example video and/or audio information, in an optically readable structure, which apparatus comprises a radiation source, an objective system for focussing the radiation supplied by the radiation source onto a plane of the information structure, optical means for deriving a read beam and a focus detection beam angularly diverging from said read beam from the radiation supplied by the radiation source, the apex of the angle of divergence of said focus detection beam and said read beam being located between the optical means and the objective system forming an imaginary radiation source, a radiation-sensitive signal detection system for converting the read beam which is modulated by the information structure into an electrical signal, and a radiation-sensitive focus detection system for converting the focus detection beam into an electrical signal, the optical means comprising a Wollaston prism disposed between the radiation source and the objective system, and a radiation absorbing element in the path of said focus detection beam between the imaginary radiation source for the focus detection beam for blocking a part of said focus detection beam and introducing spatial assymetry into said focus detection beam.

2. An apparatus as claimed in claim 1 for reading a reflecting record carrier, further comprising a λ/4 plate having an optic axis diagonally arranged with respect to the optic axis of said Wollaston prism disposed in the radiation path between the Wollaston prism and the objective system, the signal detection system and the focus detection system being disposed at the same side of the Wollaston prism as the radiation source.

3. An apparatus as claimed in claim 2, wherein the focus detection system comprises at least two detectors, the detectors of the focus detection system being rigidly connected to those of the signal detection system, and means for subtracting the outputs of said two detectors of said focus detection system, the difference of the output signals of said detectors providing an indication of a deviation between the actual and the desired position of the Wollaston prism relative to the detectors.

* * * * *

UNITED STATES PATENT AND TRADEMARK OFFICE
CERTIFICATE OF CORRECTION

PATENT NO. : 3,969,576
DATED : July 13, 1976
INVENTOR(S) : LIEUWE BOONSTRA ET AL It is certified that error appears in the above-identified patent and that said Letters Patent are hereby corrected as shown below:

Col. 2, line 27, "said" should be --the--.

Col. 3, line 6, "$\mu_2$" should be --$\beta_2$--;

Col. 6, line 17, "12" should be --11--;

Signed and Sealed this

Fourteenth Day of December 1976

[SEAL]

Attest:

RUTH C. MASON
*Attesting Officer*

C. MARSHALL DANN
*Commissioner of Patents and Trademarks*